Patented May 13, 1941

2,242,019

UNITED STATES PATENT OFFICE 2,242,019

LAMINATED GLASS

Adolf Weihe, Bad Soden, Taunus, and Fritz Herrlein, Frankfort - on - the - Main - Hochst, Germany, assignors, by mesne assignments, to General Aniline & Film Corporation, New York, N. Y., a corporation of Delaware No Drawing. Application April 11, 1939, Serial No. 267,314. In Germany April 14, 1938

1 Claim. (Cl. 49—92)

The present invention relates to laminated glass.

Many attempts have already been made to use the acetal-like condensation products of polyvinyl alcohol with aldehydes for the manufacture of intermediate layers for laminated glass. It has been found suitable to use for this purpose polyvinyl acetals which have not been completely acetalised and therefore still contain a high percentage of free hydroxyl groups, because otherwise the required strong adhesion of the intermediate layers to the glass cannot be attained. Such intermediate layers, however, are to a certain extent hydrophilic. Their swelling power in water is in a due proportion to the content of hydroxyl groups in the highly polymeric product. In the laminated glass made with the aid of intermediate layers of this kind the hydrophilic character has a detrimental effect during damp weather unless the edges of the glass are specially hardened. This hardening increases the cost of the glass and renders its manufacture more complicated.

We have now found that these drawbacks can be avoided by using acetal-like condensation products from polyvinyl alcohol and hydroaromatic ketones, if required together with a softening agent. The introduction of the strongly hydrophobic hydroaromatic component into the molecule of the polyvinyl alcohol results in such a strong water-repelling action that it is no longer necessary to harden the edges of the laminated glass. Nevertheless the intermediate layers adhere excellently to the glass plates. Furthermore with the aid of these condensation products laminated glass can be made which does not splinter when tested in various manners even at a temperature of —45° C., for instance by causing a steel ball weighing 790 grams to fall on the plate from a height of 2 meters. On the contrary, the steel ball rebounds elastically and rises to a height of 40 centimeters. No splinter fragments are found on the lower side of the glass. Even at a temperature up to +45° C. splinterless glass of the kind herein described fulfills the highest requirements. The layers can readily be adjusted in such a manner that when the plate is caused to fall vigorously on wooden balls at room temperature or at a temperature higher than room temperature, for instance up to 45° C., the broken sheets, owing to the high flexibility of the intermediate layer, become arched hemispherically; no splinter fragments are produced. This has the advantage that if the driver of a car is thrown against the windscreen in a collision he is essentially less endangered than in the case of a rigid splinterless glass or even a pure silicate glass.

The acetal-like condensation products from polyvinyl alcohol and hydroaromatic ketones suitable for the purpose of the invention are, for instance, the products described in U. S. Patent No. 1,933,986. They may be prepared by means of the process described in said U. S. Patent No. 1,933,986 or by means of the process described in our co-pending U. S. application Serial No. 257,964 filed February 23, 1939, relating to the reaction of aldehydes with polyvinyl alcohol; they may, however, also be made according to any other method.

The condensation products may be used for making laminated glass consisting of two sheets of glass with an intermediate layer of the condensation product. It is also possible to combine more than two sheets of glass by a corresponding number of intermediate layers of the condensation products. Softening agents, such as 2-ethyl-hexandiol-1.3, or solvents of high-boiling point may be incorporated in the intermediate layers.

The laminated glass may be prepared with the aid of finished films or foils of the condensation products or the condensation product may be softened by heating and placed in this condition between the sheets of glass, or a solution of the condensation product in an organic solvent may be cast on the sheets of glass; the sheets of glass are then pressed together in a manner usual for the manufacture of laminated glass.

The following examples serve to illustrate the invention, but they are not intended to limit it thereto, the parts being by weight:

1. 100 parts of a condensation product from highly viscous polyvinyl alcohol with a molecular weight of about 160,000 according to Staudinger and methylcyclohexanone are intimately mixed with 10 parts of methylcyclohexanone, 20 parts of cyclohexylidine-cyclohexanone and 16 parts of a neutral ester from diglycolic acid and methylcyclohexanol and the mixture is gradually heated in a kneading apparatus to 70° C. The mass gelatinises in the course of 1 hour and becomes viscous and gummy.

The mass is introduced into a calender for drawing foils and shaped into foils of a thickness of 0.6 mm. at 60° C. Directly after the foils have left the calender they are placed, while still hot, between sheets of glass which are then pressed together with the aid of soft rubber rollers. The sheets of glass are then placed into an autoclave filled with oil which has been preheated to 60° C. The autoclave is closed and exposed to a pressure of 20 atmospheres while the temperature is raised to 110° C. The whole is then cooled to 60° C. under pressure and the finished laminated glass is removed from the oil bath. The sheets are freed from oil by washing with light benzine.

2. 100 parts of a condensation product of polyvinyl alcohol of an average viscosity and a molecular weight of about 120,000 according to Staudinger and para-isooctylcyclohexanone (obtained from isooctylphenol) are dissolved in 200 parts of a mixture of equal parts of benzene and alcohol, with the addition of 40 parts of succinic acid dicyclohexyl ester and 10 parts of cyclohexanone. The solution is filtered through layers of wadding in a single-cell high pressure filter and de-aerated in the manner usual for the manufacture of films. The solution is poured in known manner on sheets of plate glass of a thickness of 2.2 mm. After the solvent has evaporated two of the sheets are superposed in known manner with the coated sides towards one another so as to form a laminated glass.

We claim:

A laminated glass comprising at least two sheets of glass and at least one intermediate layer comprising a condensation product of a polyvinyl alcohol with methylcyclohexanone and the neutral ester of diglycolic acid with methylcyclohexanol.

ADOLF WEIHE.
FRITZ HERRLEIN.